INVENTOR.
ROBERT C. RUSSELL
BY Hudson Boughton,
Williams, David & Hoffmann
ATTORNEYS

United States Patent Office 2,944,441
Patented July 12, 1960

2,944,441

MULTIPLE-TURBINE TORQUE CONVERTER

Robert C. Russell, Shaker Heights, Ohio, assignor to Eaton Manufacturing Company, Cleveland, Ohio, a corporation of Ohio Filed May 20, 1957, Ser. No. 660,295

23 Claims. (Cl. 74—677)

This invention relates to power transmission mechanisms of the multiple-turbine fluid torque converter type and, as one of its objects, provides a transmission of this type in which a high degree of torque amplification is obtainable for an operating range of wide scope and substantial duration, and which transmission will operate with high efficiency during both the torque-amplifying portion of its operating range and the direct-drive or fluid coupling portion of its operating range.

Another object of this invention is to provide a multiple-turbine torque converter type of transmission suitable for vehicle use and including torque amplifying mechanical gearing for connecting the turbines with an output means, and in which such gearing is usable to full advantage throughout a wide range of vehicle speeds, in accordance with load requirements or driver demands for such geared torque amplification, and without interference by any premature tendency of the transmission to assume a coupled condition in which torque amplification has substantially disappeared.

A further object is to provide such a torque converter type of transmission having cooperating rotatable bladed annular members defining a toroidal fluid circuit, and in which blade elements of at least one of the bladed members are shiftable automatically to different operative positions in the fluid circuit.

Still another object is to provide a torque converter transmission of the kind mentioned above in which the automatic shifting of such blade elements to the different operative positions is accomplished in response to a control rotational movement beween a blade actuating member and the member carrying the shiftable blade elements.

Yet another object is to provide a torque converter type of transmission in which the member carrying the shiftable blade elements also has other blade elements fixed thereon, and in which the control rotational movement for automatically shifting the shiftable blade elements is in response to impingement of fluid of the circuit against such other blade elements.

It is likewise an object of this invention to provide such a torque converter type of transmission in which the cooperating bladed members include a pump means, and in which member carrying the shiftable blade elements in a reaction means and the shiftable blade elements are located adjacent the inlet portion of the pump means.

Additionally this invention provides a transmission of the kind above referred to, in which the mechanical gearing is of the epicyclic type and preferably comprises interconnected planetary gear trains and is at times referred to herein as a compound planetary gear system.

Other objects and advantages of this invention will be apparent in the following detailed description and in the accompanying drawings forming a part of this specification and in which.

Figure 5:
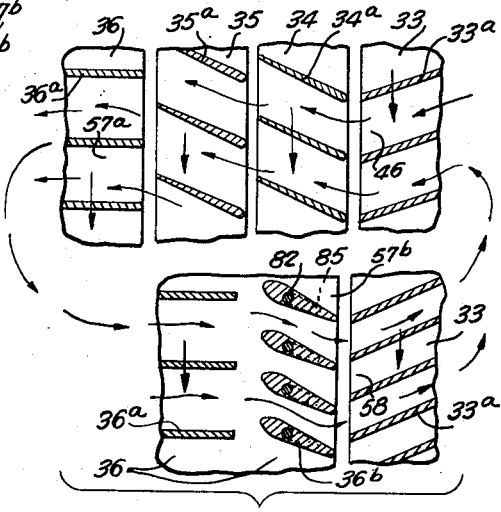
Figure 6:
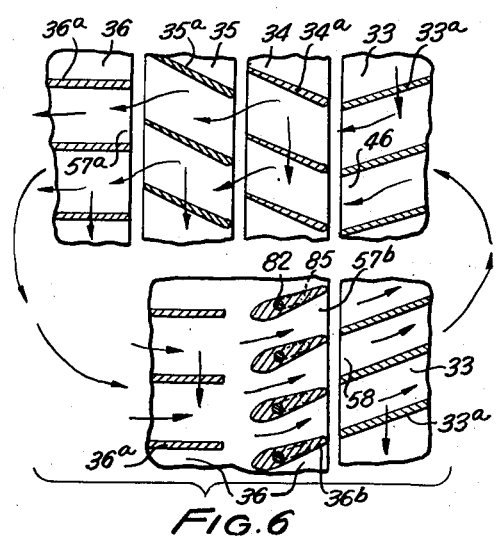

Fig. 5 is a diagrammatic representation of the cooperating bladed annular members and illustrates the action of the fluid and the setting of the shiftable blades during the stall or starting condition of the vehicle equipped with the present transmission; and Fig. 6 is a diagrammatic view similar to that of Fig. 5, but illustrating the action of the fluid and the position of the shiftable blades during cruising operation of the vehicle equipped with this transmission.

Figure 1:
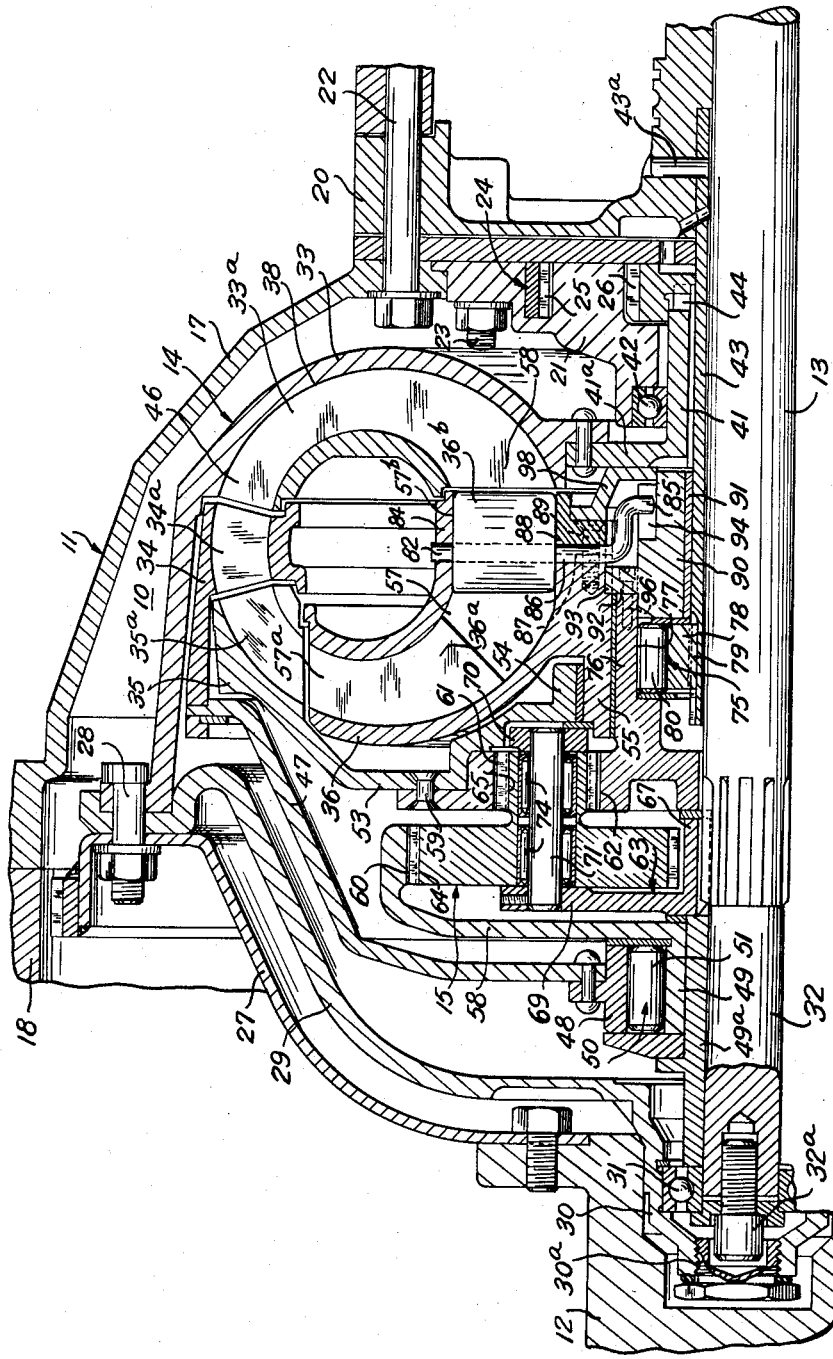
Fig. 1 is a partial vertical axis section taken through a transmission mechanism embodying the present invention.
Figure 2:
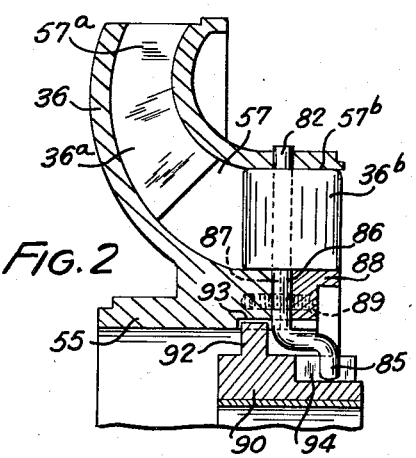
Fig. 2 is a fragmentary axial section corresponding with a portion of Fig. 1 and showing the reaction means in detached relation, the view being taken substantially as indicated by section line 2—2 of Fig 3.

As representing one practical embodiment of the present invention, Fig. 1 shows the novel transmission mechanism 10 as comprising in general a stationary outer housing 11 having substantially coaxially aligned rotatable input and output shafts 12 and 13, a torque converter unit 14 rotatable in the housing 11 about the common axis of the shafts 12 and 13, and mechanical gearing 15 located in the housing 11 and operable to connect bladed components of the torque converter unit 14 with the output shaft 13.

The outer housing 11 is here represented by a housing member 17 which has its forward end suitably attached to a vehicle engine or power unit 18, and has its rear end connected with stationary support members 20 and 21 by means of bolts 22 and 23. An oil pump 24 of the gear and crescent type is here shown as being located in the support member 21 and includes an internal ring gear 25 in meshed engagement with a gear 26 which is driven from the torque converter unit 14 in the manner explained hereinafter.

The input shaft 12 can be any available power shaft, such as the rear end of the crank shaft of an internal combustion engine, and carries a bell-shaped annular driving flange 27 for connection with the torque converter unit 14, as will be presently explained. The output shaft 13 projects from the housing 11 at the rear end thereof for connection with the load to be driven.

The torque converter unit 14 comprises a group of relatively rotatable bladed annular members 33, 34, 35 and 36 in cooperating relation and defining a toroidal fluid path or circuit 38 interiorly of this unit. The first member of this group is a hollow annular pump member 33 having an annular group of spaced blades or vanes 33a therein and is adapted to be rotatably driven by the input shaft 12 by reason of this member being connected with the annular flange 27 of the input shaft as by means of the bolts 28.

The pump member 33 is provided centrally thereof with a hollow axial hub 41 located substantially on the central axis of the unit 14 and rotatably supported in the stationary member 21 by means of an antifriction bearing 42. The hub 41 of the pump member 33 is disposed around, and spaced from, a stationary sleeve 43 which extends into the housing 11 from the rear end thereof in a surrounding coaxial relation to the output shaft 13. The sleeve 43 can be connected with the stationary member 20 as by means of the transverse pin 43a.

The hub 41 carries a radial annular flange 41a to which the bladed portion of the pump member is secured as by means of rivets. The rear end of the hub 41 is provided with a toothed portion 44 having a driving connection with the gear 26 of the oil pump 24.

The pump member 33 is also supported adjacent the front end of the unit 14 by a bell-shaped support flange 29 of an axial hub 30. The hub 30 is rotatably supported by an antifriction bearing 31 which is mounted therein and retained on a reduced portion 32 of the output shaft 13 by a cap screw 32a. The hub 30 has a central axial opening therein which is closed by a screw plug 30a.

The annular member 34 of the unit 14 is a first or primary turbine, which can also be referred to as a high speed turbine, and is a hollow member containing an annular group of blades or vanes 34a. This first or high speed turbine 34 is the second bladed member of the group or series and is located immediately adjacent the delivery portion 46 of the pump member 33 to receive the velocity discharge of fluid directly from the latter. The turbine 34 includes a substantially bell-shaped support flange 47 by which this turbine is connected with an outer support hub 48. The outer hub 48 is disposed in surrounding relation to an inner hollow axial hub 49 which is journalled on a spacer sleeve 49a disposed around the shaft portion 32. The hub 49 is connected with, or forms a part of, one of the gear members of the gear means 15 as will be explained hereinafter.

The outer and inner hub members 48 and 49 also form the outer and inner races of a one-way clutch device 50 having an annular group of clutch rollers 51 disposed between such races. The turbine 34 is supported by the one-way clutch 50 for rotation about the axis of the output shaft 13 in the manner explained hereinafter.

The second or secondary turbine 35 is a hollow annular member containing an annular group of blades or vanes 35a. The member 35 is the third bladed member of the series and is located immediately adjacent the first turbine 34 to receive the velocity stream of fluid directly from the latter. This second turbine can also be referred to as a low speed turbine. The turbine 35 includes a generally radially extending annular flange portion 53 which is provided substantially centrally thereof with a hollow axial hub 54. This turbine is supported for rotation by having the hub 54 journalled on a hub 55 of the next adjacent bladed annular member 36.

The bladed annular member 36 of the torque converter unit 14 is a hollow member having a curved annular passage 57 containing a first annular group of fixed vanes or blade elements 36a and a second annular group of shiftable vanes or blade elements 36b. The member 36 is the fourth bladed member of the series. As will be further explained hereinafter, this fourth bladed member 36 functions at certain times as a reaction member and at other times as a turbine or runner, and can therefore be referred to either as a reaction member or turbine, or as a combination turbine and reaction member.

This bladed member 36 is disposed in the series so that the portion 57a thereof containing the blade elements 36a is located immediately adjacent the second turbine 35 and receives the discharged fluid directly from the latter. The passage portion 57b containing the shiftable blade elements 36b is located immediately adjacent the pump member 33 and delivers the fluid into the inlet portion 58 of the latter. As shown in Fig. 1, the inlet passage portion 57a containing the fixed blade elements 36a extends in a radial direction relative to the axis of the output shaft 13 and the discharge passage portion containing the shiftable blade elements 36b extends in an axial direction parallel to the output shaft.

The mechanical gear means 15 comprises gear trains of the epicyclic type and provides a torque amplifying gear means or system which is, at times, referred to herein as a compound planetary gear system. A compound planetary gear system is, by definition, a planetary gear system having two power input members or elements. The planetary gear system 15 includes two such power input members, namely, a first ring gear 60 driven by the first turbine 34 and a second ring gear 61 driven by the second turbine 35. The planetary gearing 15 also includes a sun gear 62 lying substantially opposite the second ring gear 61, and a carrier means 63 which is drivingly connected with the output shaft 13.

The first ring gear 60 is carried by an annular flange 58 of the inner hub 49 so as to be rotatably supported by the latter and is adapted to be connected with the first turbine 34 by the clutch device 50. The second ring gear 61 is connected with the annular support flange 53 of the second turbine 35 as by the rivets 59.

The planetary gearing 15 additionally comprises interconnected planet gears or pinions 64 and 65 of which the planet gear 64 is in meshed engagement with the first ring gear 60. The planet gear 65 is disposed between, and is in meshed engagement with, the second ring gear 61 and the sun gear 62. The two interconnected planet gears 64 and 65 constitute a set of planet gears and, although Fig. 1 shows only one such set of planet gears, it will be understood that there may be a plurality of such sets distributed in an annular group around the carrier means 63.

The carrier means 63 may be of any appropriate construction and is here shown as comprising a body having a central hollow axial hub 67 which is fixed on the output shaft 13 by the splined connection 68. The body of the carrier 63 is represented by axially spaced flange and ring portions 69 and 70 of which the radial flange portion 69 is connected directly with the hub 67. The carrier 63 also comprises one or more pivot shafts 71 extending substantially parallel to the output shaft 13 and having their ends mounted in the flange and ring portions 69 and 70.

The planet gears 64 and 65 are of suitable diameters in relation to their associated ring gears 60 and 61, such that their meshed engagement with the ring gears will provide different desired gear ratios for the respective turbines 34 and 35. The planet gears 64 and 65 are here shown as being integrally connected in a substantially coaxially extending relation and are rotatably supported by one of the pivot shafts 71. In this instance the planet gears 64 and 65 are mounted on the pivot shaft 71 by means of needle bearings 74.

The sun gear 62 is disposed around the output shaft 13 and is supported by the stationary sleeve 43 through a one-way brake device 75. The sun gear preferably includes an axial hub or sleeve 76 with a portion thereof forming an outer race 77 for the one-way brake 75. The outer race 77 is disposed in surrounding relation to an inner race 78 which is mounted in a fixed relation on the sleeve 43 by a splined connection 79. The one-way brake 75 also comprises an annular group of rollers 80 disposed between and cooperating with the outer and inner races 77 and 78. The hub portion 76 of the sun gear 62 also forms a journal on which the hub portion 55 of the bladed member 36 is rotatable. The one-way brake 75 permits a relatively free forward rotation of the sun gear 62 but prevents rotation of this gear in the reverse direction.

The shiftable blade elements 36b of the combination turbine and reaction member 36 are movable to different operative positions in the discharge passage portion 57b and, for this purpose, are secured on pivot shafts 82 which extend generally radially across this passage portion. The pivot shafts 82 have their outer ends journalled in the annular wall 84 of the combination member 36 and at their inner ends are provided with crank arms 85. The straight shaft portions 86 adjacent the crank arms 85 are journalled in radial bearing grooves 87 formed in the right hand end of the hub portion 55 of this combination member. An annular bearing cap 88 having similar radial grooves therein is secured to the hub portion 55 by screws 89 to complete the journal mounting of the pivot shafts 82 on the combination member 36.

For the automatic actuation of the shiftable blade elements 36b, the transmission 10 is provided with an actuating member 90 which is associated with the pivot shafts 82 and is here shown as being an axially extending sleeve or ring surrounding the fixed sleeve 43 and rotatably mounted thereon as by means of the bushing 91. The combination member 36 and the actuating member 90 have a limited relative rotary movement which is utilized as a control movement for the shifting of the blade elements 36b to their different operative positions. The angular extent of this rotational control movement can be any amount suitable to the particular transmission mechanism under consideration, and which will be sufficient to produce the desired extent of actuation of the shiftable blade elements 36b. In the transmission mechanism 10, this rotational control movement is a relatively small angular movement occurring between the hub 55 and the actuating member 90 as permitted by the radial lugs 92 of the latter which extend into circumferential recesses or slots 93 of the hub.

The actuating member 90 is also provided with an annular group of axial slots 94, which are here shown as being substantially straight axial slots, formed in the periphery of this member at a point adjacent the lugs 92. The crank arms 85 of the pivot shafts 82 of the shiftable blade elements 36b are engaged in the slots 94 and cause swinging of the shiftable blade elements in response to the rotational control movement occurring between the member 36 and the actuating member 90.

Although the member 90 has been identified and referred to above as an actuating member for causing shifting of the blade elements 36b, in a stricter sense, this member is an abutment member against which the crank arms 85 of the pivot shafts 86 are reactively effective during the rotational control movement of the combination turbine and reaction member 36, for causing the automatic shifting of the shiftable blade elements.

The abutment member 90 is preferably connected with the sleeve portion 76 of the sun gear 62, as by means of screws 96, such that the rotation of the actuating member is controlled by the one-way brake 75 and will be freely rotatable in a forward direction with the sun gear but will be held against reverse rotation, simultaneously with the sun gear, by this one-way brake.

An annular thrust ring 98 is preferably provided between the flange portion 41a of the mounting hub 41 of the pump member 33 and the hub portion 55 of the combination member 36 for holding the latter in the desired position axially of the transmission 10.

From the above description of the transmission 10 it will be seen that the bladed annular members 33, 34, 35 and 36 are in a series relation and are traversed in succession in the order named by the fluid of the toroidal fluid circuit 38. It will also be seen that the fluid passing through the combination member 36 will impinge first against the relatively fixed blade elements 36a and will be subsequently directed into the inlet portion 58 of the pump member 33 by the shiftable blade elements 36b.

The ring gears 60 and 61 and their associated planet gears 64 and 65 can be of any appropriate pitch diameters and, for example, may provide torque amplifying gear ratios of 2.40 to 1.0 and 1.64 to 1.0. With appropriate blade shapes and angles for the members 33, 34 and 35, and with the sun gear 62 and the combination member 36 held against reverse rotation by their common one-way brake 75, the torque converter 14 can readily produce a torque amplification by fluid action of a ratio of 1.8 to 1.0 during the starting or stall condition of operation. From these values it will therefore follow that the total or overall maximum torque amplification of the transmission 10 at the stall condition will be 2.4 x 1.8 or a 4.3 to 1.0 ratio.

During the vehicle starting or stall condition of operation of the transmission 10, the first turbine 34 is connected with the ring gear 60 through a locked condition of the one-way clutch 50 such that torque will then be supplied through the gearing 15 to the output shaft 13 at the overall torque amplifying ratio of 4.3 to 1.0. This is a very effective torque delivery which is highly desirable for starting heavy loads and for rapid acceleration whenever needed.

As the vehicle picks up speed and the second turbine 35 starts its forward drive and progressively assumes more and more of the torque load, the overall ratio progressively diminishes both in the fluid action and in the gearing 15 wherein the second ring gear 61 and its associated planet gear 65 have now become effective. The operation of the transmission ultimately reaches the point where the turbine 35 has assumed substantially the full torque load with the torque being transmitted through the planet gear 65 substantially independently of the first turbine 34 and the planet gear 64. When this operating condition is reached, the amplification ratio will be a value somewhat greater than the minimum 1.64 to 1.0 value and the remaining fluid-action amplification will then be only a small component of the overall ratio.

During the above-explained operation of the transmission 10, the fourth bladed member 36 of the series initially functions as a reaction member, at which time it is held against reverse rotation by the brake device 75. Gradually the function of the member 36 changes from that of a reaction member to a forward driving turbine member and it then imparts forward rotation to the sun gear 62. Eventually, the bladed members all rotate in the forward direction as a unit and at the same speed, at which time all torque amplification will be exhausted and the torque converter unit 14 will be in a fluid coupled condition and the transmission 10 will be operating with substantially a 1.0 to 1.0 ratio.

During the starting or stall condition of operation of the transmission 10, or during any period of acceleration, the direction of impingement of the fluid being discharged by the secondary turbine 35 against the fixed blade elements 36a is such as to tend to cause rotation of the combination member 36 in a reverse direction. At this time, the member 36 will actually rotate in such a reverse direction to the extent permitted by the lugs 92, while the sun gear 62 and the abutment member 90 are being held against reverse rotation by the one-way brake 75.

Figure 3:
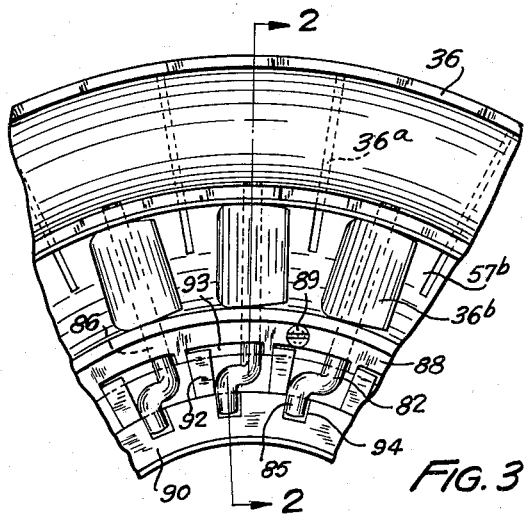
Fig. 3 is an end elevation of the reaction means of Fig. 2.

This reverse rotation of the member 36 relative to the abutment member 90 is the above-mentioned rotational control movement which causes swinging of the blade elements 36b and results in these blade elements assuming the setting thereof shown in Figs. 3 and 5. When the blade elements 36b are in the position shown in Figs. 3 and 5, the member 36 will be of maximum effectiveness as a reaction member and will cause a high value of fluid-action torque amplification to be achieved.

As the speed of rotation of the secondary turbine 35 increases, the direction of impingement of the fluid discharged thereby against the fixed blade elements 36a will change progressively, and ultimately, the direction of this impingement will be such as to cause a forward rotation of the member 36. While the speed of rotation of the secondary turbine 35 is thus increasing and this member is assuming more and more of the torque load of the output shaft 13, the sun gear 62 is functioning as a reaction gear which is being held against reverse rotation by the one-way brake 75. Since the abutment member 90 is connected with the sun gear 62 and is also held against reverse rotation by the one-way brake 75, the forward rotation of the member 36 relative to the abutment member 90, as produced by the impingement of the fluid against the fixed blades 36a and to the extent permitted by the circumferential slots 93, is a rotational control movement which causes the crank arms 95 to swing the blade elements 36b to the cruising position shown in Figs. 4 and 6.

As the speed of the driven load or vehicle increases, the sun gear 62 will begin to rotate in a forward direction. The initial forward rotation of the sun gear 62 will be relatively slower than that of the member 36, such that the differential or resultant movement between the sun gear and the member 36 will still be a forward rotation of the latter relative to the abutment member 90. Since this resultant forward rotational control movement is initially a relatively slow movement, the swinging of the blade elements 36b toward their crusing position of Fig. 4 as produced thereby, will be a desired gradual swinging.

Figure 4:
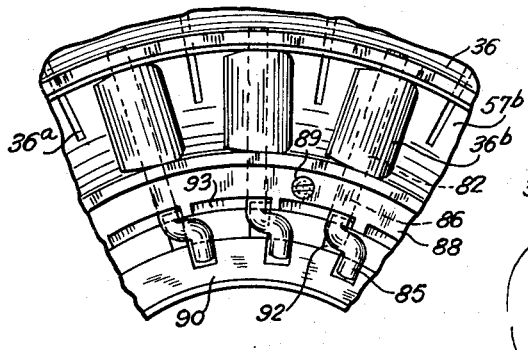
Fig. 4 is an end elevation similar to that of Fig. 3, but with the shiftable blade elements in a different operative position.

When the blade elements 36b occupy the setting shown in Figs. 4 and 6, they direct the fluid into the inlet portion 58 of the pump member 33 smoothly and with minimum turbulence such that the reaction effect of the combination member 36 will then be of a minimum or zero value and the torque converter unit 14 will operate with maximum efficiency during the fluid-coupled condition of its bladed members.

In the operation of a vehicle equipped with the transmission 10, an extended range of torque amplification is obtainable because the blade elements 36b will be shifted automatically to their different settings in response to changes in the operating condition of the vehicle. Thus, when the vehicle is operating at a high rate of speed, such as seventy miles per hour, with an intermediate throttle position, the 1.6 amplification ratio of the gear means 14 can still be used because the actuation of the throttle at this time to its full-open position will result in a fluid discharge from the turbine 35 in a rearward direction and this will cause the blade elements 36b to be shifted to the position of Figs. 3 and 5 in which they have a maximum reaction effect. On the other hand, whenever the vehicle is operating under a light load and with a reduced throttle opening, the fluid discharge from the turbine 35 will be in a forward direction and will result in the blade elements 36b being shifted to their coupling position of Figs. 4 and 6.

From the accompanying drawings and the foregoing detailed description it will accordingly be understood that this invention provides a transmission mechanism embodying a fluid torque converter unit, in which at least one of the bladed members of the torque converter unit carries blades which are automatically shiftable from one operating position to another in the fluid circuit, such that for one setting of the shiftable blades the fluid will have a maximum effectiveness on the member carrying the same and a minimum effectiveness thereon for another setting of the blades.

It will now also be understood that the member carrying the shiftable blades is preferably a combination turbine and reaction member which also has other blades fixed thereon, such that a rotational control movement for actuating the shiftable blades is automatically obtainable in response to changes in the direction of impingement of the fluid against the fixed blades. It will be understood further that when the shiftable blades are a part of a reaction member they will, for one setting thereof, produce a maximum fluid reaction effect and, for another setting thereof, will cause the fluid to be smoothly directed into the intake portion of the pump member for the achievement of maximum efficiency of operation when the members of the torque converter unit are in a fluid-coupled condition.

Additionally, it will be seen that this invention achieves the automatic shifting of the shiftable blades by a rotational control relative movement occurring between the member carrying such shiftable blades and an actuating member connected with the sun gear of a planetary gear system embodied in the transmission mechanism.

Although the novel transmission mechanism has been illustrated and described herein to a somewhat detailed extent, it should be understood nevertheless, that the invention is not to be regarded as being limited correspondingly in scope, but includes all changes and variations coming within the terms of the claims hereof.

Having thus described my invention, I claim:

1. In a power transmission; a group of cooperating relatively rotatable bladed annular members defining a toroidal fluid circuit and including pump means, turbine means, and reaction means inhibited against reverse rotation; said members being disposed in a series relation to be traversed in succession in the order named by the fluid of said circuit; rotatable power input means connected with said pump means; rotatable output means; an epicyclic gear system including a reaction gear means inhibited against reverse rotation and a pinion gear carrier means of which the latter is drivingly connected with said output means; said gear system also comprising a main gear means connected with said turbine means, and pinion gear means on said carrier means and having meshed engagement with said main gear means and said reaction gear means; said gear system providing for the transmission of torque from said turbine means to said output means through said carrier means; said reaction means having blade elements shiftable thereon to different operative positions and said reaction means having limited rotation relative to said reaction gear means; and means responsive to such limited relative rotation for shifting said blade elements to said different operative positions.

2. A power transmission as defined in claim 1 in which said reaction means has a fluid discharge portion located to deliver fluid directly to said pump means; and in which said blade elements are located in said discharge portion.

3. In a power transmission; a group of cooperating relatively rotatable bladed annular members defining a toroidal fluid circuit and including pump means, turbine means, and a combination turbine and reaction member inhibited against reverse rotation; said members being disposed in a series relation to be traversed in succession in the order named by the fluid of said circuit and said combination member having blade elements shiftable thereon to different operative positions; rotatable power input means connected with said pump means; rotatable output means; an epicyclic gear system including a reaction gear means inhibited against reverse rotation and a pinion gear carrier means of which the latter is drivingly connected wtih said output means; said gear system also comprising a main gear means connected with said turbine means, and pinion gear means on said carrier means and having meshed engagement with said main gear means and said reaction gear means; said gear system providing for the transmission of torque from said turbine means to said output means; said combination member having limited rotation relative to said reaction gear means; and means responsive to such limited relative rotation for shifting said blade elements to said different operative positions.

4. In a power transmission; a group of cooperating relatively rotatable bladed annular members defining a toroidal fluid circuit and including pump means, primary and secondary turbines, and reaction means inhibited against reverse rotation; said members being disposed in a series relation to be traversed in succession in the order named by the fluid of said circuit; rotatable power input means connected with said pump means; rotatable output means; an epicyclic gear system including a reaction gear means inhibited against reverse rotation and a pinion gear carrier means of which the latter is drivingly connected with said output means; said gear system also comprising interconnected epicyclic gear trains including pinion gears on said carrier means, and first and second main gears connected with said primary and secondary turbines; said gear trains providing for the transmission of torque from said turbines to said output means at different ratios through said carrier means; said reaction means having blade elements shiftable thereon to different operative positions and said reaction means having limited rotation relative to said reaction gear means; and means responsive to such limited relative rotation for shifting said blade elements to said different operative positions.

5. In a power transmission; a group of cooperating relatively rotatable bladed annular members defining a toroidal fluid circuit and including pump means, primary and secondary turbines, and a combination turbine and reaction member inhibited against reverse rotation; said members being disposed in a series relation to be traversed in succession in the order named by the fluid of said circuit and said combination member having blade elements shiftable thereon to different operative positions; rotatable power input means connected with said pump means; rotatable output means; an epicyclic gear system including a reaction gear means inhibited against reverse rotation and a pinion gear carrier means of which the latter is drivingly connected with said output means; said gear system also comprising interconnected epicyclic gear trains including pinion gears on said carrier means, and first and second main gears connected with said primary and secondary turbines; said gear trains providing for the transmission of torque from said turbines to said output means at different ratios through said carrier means; said combination member having limited rotation relative to said reaction gear means; and means responsive to such limited relative rotation for shifting said blade elements to said different operative positions.

6. In a power transmission; a group of cooperating relatively rotatable bladed annular members defining a toroidal fluid circuit and including pump means, turbine means and reaction means inhibited against reverse rotation; said members being disposed in a series relation to be traversed in succession in the order named by the fluid of said circuit; rotatable power input means connected with said pump means; rotatable output means; an epicyclic gear system including a reaction gear means and a pinion gear carrier means of which the latter is drivingly connected with said output means; said gear system also comprising a main gear means connected with said turbine means, and pinion gear means on said carrier means and having meshed engagement with said main gear means and said reaction gear means; said gear system providing for the transmission of torque from said turbine means to said output means through said carrier means; said reaction means having blade elements relatively fixed thereon and other blade elements shiftable thereon to different operative positions in said fluid circuit; said reaction means being subject to a rotation tendency in a backward direction in response to a first impingement action of the fluid discharge of said turbine means against the fixed blade elements, and being also subject to a subsequent rotation tendency in a forward direction in response to a different impingement action of the fluid discharge of said turbine means against said fixed blade elements; a rotatable abutment member connected with said reaction gear means and effective in causing shifting of said other blade elements; co-operable stop elements effective between said abutment member and said reaction means for limiting relative rotation therebetween to a control rotational movement of said reaction means; one way brake means effective on said abutment member and said reaction gear means to prevent backward rotation thereof, and to also prevent backward rotation of said reaction means beyond the limited rotation thereof permitted by said stop elements; and means effective between said abutment member and said other blade elements for shifting the latter to said different positions in response to said control rotational movement.

7. In a power transmission, a group of cooperating relatively rotatable bladed annular members defining a toroidal fluid circuit and including pump means, turbine means, and reaction means inhibited against reverse rotation; said members being disposed in a series relation to be traversed in succession in the order named by the fluid of said circuit; rotatable power input means connected with said pump means; rotatable output means; an epicyclic gear system including a reaction gear means inhibited against reverse rotation and a pinion gear carrier means of which the latter is drivingly connected with said output means; said gear system also comprising a main gear means connected with said turbine means, and pinion gear means on said carrier means and having meshed engagement with said main gear means and said reaction gear means; said gear system providing for the transmission of torque from said turbine means to said output means through said carrier means; said reaction means having relatively fixed blade elements thereon and also having other blade elements relatively shiftable thereon to different operative positions; said reaction means having limited rotation relative to said reaction gear means in response to impingement of said fluid against said fixed blade elements; and means responsive to such limited relative rotation for shifting said other blade elements to said different operative positions.

8. A power transmission as defined in claim 7 in which said reaction means has an inlet portion located to receive fluid directly from said turbine means and a discharge portion located to deliver fluid directly to said pump means; and in which said fixed blade elements are in said inlet portion and said other blade elements are in said discharge portion.

9. In a power transmission; a group of cooperating relatively rotatable bladed annular members defining a toroidal fluid circuit and including pump means, turbine means, and reaction means inhibited against reverse rotation; said members being disposed in a series relation to be traversed in succession in the order named by the fluid of said circuit; rotatable power input means connected with said pump means; rotatable output means; an epicyclic gear system including a reaction gear means and a pinion gear carrier means of which the latter is drivingly connected with said output means; said gear system also comprising a main gear means connected with said turbine means, and pinion gear means on said carrier means and having meshed engagement with said main gear means and said reaction gear means; said gear system providing for the transmission of torque from said turbine means to said output means through said carrier means; said reaction means having relatively fixed blade elements thereon and also having other blade elements relatively shiftable thereon to different operative positions; a rotatable actuating member; rotation control means comprising one-way brake means preventing reverse rotation of said actuating member and of said reaction gear means; said reaction means having a rotational control movement relative to said actuating member in response to impingement of said fluid against said fixed blade elements; means for limiting the extent of said rotational control movement of said reaction means; and means responsive to said rotational control movement for shifting said other blade elements to said different operative positions.

10. In a power transmission; a group of cooperating relatively rotatable bladed annular members defining a toroidal fluid circuit and including pump means, turbine means, and a combination turbine and reaction member inhibited against reverse rotation; said members being disposed in a series relation to be traversed in succession in the order named by the fluid of said circuit; rotatable power input means connected with said pump means; rotatable output means; an epicyclic gear system including a reaction gear means inhibited against reverse rotation and a pinion gear carrier means of which the latter is drivingly connected with said output means; said gear system also comprising a main gear means connected with said turbine means; and pinion gear means on said carrier means and having meshed engagement with said main gear means and said reaction gear means; said gear system providing for the transmission of torque from said turbine means to said output means; said combination member having relatively fixed blade elements thereon and also having other blade elements relatively shiftable thereon to different operative positions; said combination member having limited rotation relative to said reaction gear means in response to impingement of said fluid against said fixed blade elements; and means responsive to such limited relative rotation for shifting said other blade elements to said different operative positions.

11. In a power transmission; a group of cooperating relatively rotatable bladed annular members defining a toroidal fluid circuit and including pump means, primary and secondary turbines, and reaction means inhibited against reverse rotation; said members being disposed in a series relation to be traversed in succession in the order named by the fluid of said circuit; rotatable power input means connected with said pump means; rotatable output means; an epicyclic gear system including a reaction gear means inhibited against reverse rotation and a pinion gear carrier means of which the latter is drivingly connected with said output means; said gear system also comprising interconnected epicyclic gear trains including pinion gears on said carrier means, and first and second main gears connected with said primary and secondary turbines; said gear trains providing for the transmission of torque from said turbines to said output means at different ratios through said carrier means; said reaction means having relatively fixed blade elements thereon and also having other blade elements relatively shiftable thereon to different operative positions; said reaction means having limited rotation relative to said reaction gear means in response to impingement of said fluid against said fixed blade elements; and means responsive to such limited relative rotation for shifting said other blade elements to said different operative positions.

12. In a power transmission; a group of cooperating relatively rotatable bladed annular members defining a toroidal fluid circuit and including pump means, primary and secondary turbines, and a combination turbine and reaction member inhibited against reverse rotation; said members being disposed in a series relation to be traversed in succession in the order named by the fluid of said circuit; different operative positions; rotatable power input means connected with said pump means; rotatable output means; an epicyclic gear system including a reaction gear means inhibited against reverse rotation and a pinion gear carrier means of which the latter is drivingly connected with said output means; said gear system also comprising interconnected epicyclic gear trains including pinion gears on said carrier means and first and second main gears connected with said primary and secondary turbines; said gear trains providing for the transmission of torque from said turbines to said output means at different ratios through said carrier means; said combination member having relatively fixed blade elements thereon and also having other blade elements relatively shiftable thereon to different operative positions; said combination member having limited rotation relative to said reaction gear means in response to impingement of said fluid against said fixed blade elements; and means responsive to such limited relative rotation for shifting said other blade elements to said different operative positions.

13. In a power transmission; a group of cooperating relatively rotatable bladed annular members defining a toroidal fluid circuit and including pump means, turbine means, and reaction means inhibited against reverse rotation; said members being disposed in a series relation to be traversed in succession in the order named by the fluid of said circuit; rotatable power input means connected with said pump means; rotatable output means; a planetary gear system including a sun gear means inhibited against reverse rotation and a planet carrier means and of which the latter is drivingly connected with said output means; said gear system also comprising ring gear means connected with said turbine means, and planet pinion means on said carrier means and having meshed engagement with said ring gear means and said sun gear means; said gear system providing for the transmission of torque from said turbine means to said output means through said carrier means; said reaction means having blade elements shiftable thereon to different operative positions and said reaction means having limited rotation relative to said sun gear means; and means responsive to such limited relative rotation for shifting said blade elements to said different operative positions.

14. A power transmission as defined in claim 13 in which said reaction means has relatively fixed blade elements thereon and also has other blade elements relatively shiftable thereon to different operative positions; and wherein the limited rotation of said reaction means relative to said sun gear means is in response to impingement of said fluid against said fixed blade elements.

15. In a power transmission; a group of cooperating relatively rotatable bladed annular members defining a toroidal fluid circuit and including pump means, primary and secondary turbines, and reaction means inhibited against reverse rotation; said members being disposed in a series relation to be traversed in succession in the order named by the fluid of said circuit; rotatable power input means connected with said pump means; rotatable output means; a planetary gear system including a sun gear means inhibited against reverse rotation and a planet carrier means and of which the latter is drivingly connected with said output means; said gear system also comprising interconnected planetary gear trains including planet gears on said carrier means and ring gears connected to said primary and secondary turbines; said gear trains providing for the transmission of torque from said turbines to said output means at different ratios through said carrier means; said reaction means having blade elements shiftable thereon to different operative positions and said reaction means having limited rotation relative to said sun gear means; and means responsive to such limited relative rotation for shifting said blade elements to said different positions.

16. A power transmission as defined in claim 15 in which said reaction means has relatively fixed blade elements thereon and also has other blade elements relatively shiftable thereon to different operative positions; and wherein the limited rotation of said reaction means relative to said sun gear means is in response to impingement of said fluid against said fixed blade elements.

17. In a power transmission; a group of cooperating relatively rotatable bladed annular members defining a toroidal fluid circuit and including pump means, turbine means and reaction means; said members being disposed in a series relation to be traversed in succession in the order named by the fluid of said circuit; rotatable power input means connected with said pump means; rotatable output means; an epicyclic gear system including a reaction gear means and a pinion gear carrier means and of which the latter is drivingly connected with said output means; said gear system also comprising a main gear means connected with said turbine means, and pinion gear means on said carrier means and having meshed engagement with said main gear means and said reaction gear means; said gear system provided for the transmission of torque from said turbine means to said output means through said carrier means; an actuating means connected with said reaction gear means and having an annular series of grooves therein; brake means for preventing reverse rotation of said reaction gear means and said actuating means; said reaction means having a rotational control movement relative to said actuating means; pivot shafts on said reaction means and having lever members engaged with said grooves for causing rotation of said pivot shafts in response to said rotational control movement; and blade elements connected with said pivot shafts and swingable thereby to different operative positions in said fluid circuit.

18. In a power transmission; a group of cooperating relatively rotatable bladed annular members defining a toroidal fluid circuit and including pump means, turbine means and reaction means; said members being disposed in a series relation to be traversed in succession in the order named by the fluid of said circuit; rotatable power input means connected with said pump means; rotatable output means; an epicyclic gear system including a reaction gear means and a pinion gear carrier means and of which the latter is drivingly connected with said output means; said gear system also comprising a main gear means connected with said turbine means, and pinion gear means on said carrier means and having meshed engagement with said main gear means and said reaction gear means; said gear system providing for the transmission of torque from said turbine means to said output means through said carrier means; a rotatable actuating member having an annular series of grooves therein; rotation control means comprising one-way brake means preventing reverse rotation of said actuating member and of said reaction gear means; said reaction means having a rotational control movement relative to said actuating member; co-operating stop elements for limiting the extent of said rotational control movement of said reaction means; pivot shafts on said reaction means and having lever members engaged with said grooves for causing rotation of said pivot shafts in response to said rotational control movement; and blade elements connected with said pivot shafts and swingable thereby to different operative positions in said fluid circuit.

19. In a power transmission; a group of cooperating relatively rotatable bladed annular members defining a toroidal fluid circuit and including pump means, turbine means and reaction means; said members being disposed in a series relation to be traversed in succession in the order named by the fluid of said circuit; rotatable power input means connected with said pump means; rotatable output means; an epicyclic gear system including a reaction gear means and a pinion gear carrier means of which the latter is drivingly connected with said output means; said gear system also comprising a main gear means connected with said turbine means, and pinion gear means on said carrier means and having meshed engagement with said main gear means and said reaction gear means; said gear system providing for the transmission of torque from said turbine means to said output means through said carrier means; an actuating means connected with said reaction gear means and having an annular series of grooves therein; brake means for preventing reverse rotation of said reaction gear means and said actuatnig means; first blade elements carried by said reaction means in a fixed relation thereon; said reaction means having a rotational control movement relative to said actuating means in response to impingement of said fluid against said first blade elements; pivot shafts on said reaction means and having lever members engaged with said grooves for causing rotation of said pivot shafts in response to said rotational control movement; and other blade elements connected with said pivot shafts and swingable thereby to different operative positions.

20. In a power transmission mechanism of the combined fluid torque converter and mechanical gear train type; a group of cooperating rotatable bladed annular members defining a toroidal fluid circuit including pump means, primary and secondary turbines, and reaction means inhibited against reverse rotation; said members being in a series relation in said circuit to be traversed successively in the order named by the fluid thereof; rotatable power input means connected with said pump means; rotatable output shaft means; rotatable gear-carrier means having a drive connection with said output shaft means; dual planetary gear means operably connecting said turbines with said output shaft means through said gear-carrier means and including a reaction gear means; said reaction means having blade elements shiftable thereon to occupy different operative positions in said circuit; a rotatable actuating member connected with said reaction gear means; rotation control means comprising one-way brake means preventing reverse rotation of said actuating member and of said reaction gear means; said reaction means having a rotational control movement relative to said actuating member; and means responsive to said rotational control movement for shifting said blade elements to said different operative positions.

21. In a power transmission of the fluid coupling type having cooperating relatively rotatable bladed annular members defining a toroidal fluid circuit and including pump means, turbine means and reactor means; power input means connected with said pump means; a power output means; torque transmitting gear means comprising a train of gear members operably connecting said turbine means with said output means for delivery of torque to the latter in a forward driving direction and including a reaction gear member; said reactor means having blade elements relatively fixed thereon and other blade elements shiftable thereon to different operative positions in said fluid circuit; said reactor means being subject to a rotation tendency in a backward direction in response to a first impingement action of the fluid discharge of said turbine means against the fixed blade elements, and being also subject to a subsequent rotation tendency in a forward direction in response to a different impingement action of the fluid discharge of said turbine means against said fixed blade elements; an abutment member connected with said reaction gear member and being rotatable about the axis of said output means and effective in causing shifting of said other blade elements; co-operable stop elements effective between said abutment member and said reactor means for limiting relative rotation therebetween to a control rotational movement of said reactor means; one-way brake means effective on said reaction gear member and on said abutment member to prevent backward rotation thereof, and being also effective on said reactor means to prevent backward rotation of the reactor means beyond the limited rotation thereof permitted by said stop elements; and means connected between said abutment member and said other blade elements for shifting the latter to said different positions in response to said control rotational movement.

22. In a power transmission of the fluid coupling type having cooperating relatively rotatable bladed annular members defining a toroidal fluid circuit and including pump means, turbine means and reactor means; power input means connected with said pump means; a power output means; torque transmitting means operably connecting said turbine means with said output means for delivery of torque to the latter in a forward driving direction; said reactor means having blade elements relatively fixed thereon and other blade elements shiftable thereon to different operative positions in said fluid circuit; a rotatable actuating member; brake means effective on said actuating member for preventing backward rotation thereof; said reactor means having a control rotational movement relative to said actuating member in response to impingement of the fluid against the relatively fixed blade elements; co-operating stop elements for limiting said control rotational movement of said reactor means; and means effective between said actuating member and said other blade elements for shifting the latter to said different positions in response to said control rotational movement.

23. A power transmission as defined in claim 22 in which said reactor means has a radially disposed passage portion in said circuit and an axially disposed passage portion in said circuit; and in which said fixed blade elements are in said radially disposed passage portion and said other blade elements are in said axially disposed passage portion.

(References on following page)

References Cited in the file of this patent

UNITED STATES PATENTS

| | | |
|---|---|---|
| 1,636,262 | Troendly | July 19, 1927 |
| 2,187,937 | De Lavand | Jan. 23, 1940 |
| 2,795,154 | Russell | June 11, 1957 |

FOREIGN PATENTS

| | | |
|---|---|---|
| 406,934 | Germany | Dec. 4, 1924 |
| 425,538 | Great Britain | Mar. 18, 1935 |
| 1,140,916 | France | Apr. 21, 1957 |